United States Patent [19]

Lifshits et al.

[11] 4,061,078
[45] Dec. 6, 1977

[54] DEVICE FOR REMOVING EXTERNAL CIRCULAR FINS FROM PIPE JOINTS

[76] Inventors: Viktor Senderovich Lifshits, Kavkazsky bulvar, 21, korpus 2, kv. 41; Georgy Nikolaevich Petrov, Izmailovsky bulvar, 34/32, kv. 8; Oleg Sergeevich Papkov, Samarkandsky bulvar, 24, korpus 3, kv. 3; Vladimir Ivanovich Khomenko, ulitsa Miklukho-Maklaya, 39, korpus 2, kv. 372, all of Moscow; Alexandr Yakovlevich Gerasimenko, Sovetskaya ulitsa, 11/2, kv. 75, Elektrostal Moskovskoi oblasti; Alexandr Korneevich Taradaiko, ulitsa Mira, 30, kv. 27, Elektrostal Moskovskoi oblasti; Alexandr Mikhailovich Zemchenko, ulitsa Pushkina, 18, kv. 18, Elektrostal Moskovskoi oblasti; Ivan Petrovich Gremyakov, ulitsa Lenina, 25, kv. 9, Elektrostal Moskovskoi oblasti, all of U.S.S.R.

[21] Appl. No.: 659,264

[22] Filed: Feb. 19, 1976

[51] Int. Cl.[2] ............................................. B23D 5/02
[52] U.S. Cl. ..................................... 90/24 C; 82/2 E
[58] Field of Search ................... 90/24 C, 24 A, 24 E; 82/20, 2 E

[56] References Cited

U.S. PATENT DOCUMENTS 3,866,495  2/1975  Goeke .................................. 82/20 X Primary Examiner—Othell M. Simpson
Assistant Examiner—Z. R. Bilinsky
Attorney, Agent, or Firm—Haseltine, Lake & Waters

[57] ABSTRACT

A device for removing external circular fins from pipe joints comprising a base, a hollow rotor with a faceplate mounted in the base, carriages located on the rotor faceplate, a mechanism for radial traverse of the carriages, having a holder rotatably fitted on the rotor, and a drive for the rotor and the mechanism for traversing the carriages. Each of the carriages is provided with a roller adapted to trace over the surface of the pipes being treated, while the mechanism for radial traverse of the carriages is composed of links with one of their ends articulated to the holder and with the other end to slide blocks, each of which is housed in a bore in the respective carriage with the possibility of radial movement therein and is connected to a spring gauged for the cutting force, the other end of which spring thrusts against the bottom of the carriage bore. The drive of the rotor and of the carriage traversing mechanism has two output shafts, of which one is kinematically associated with the rotor, while the other shaft is kinematically associated with the holder, which drive is provided with a mechanism for program control of the difference between the rotational speeds of the shafts.

2 Claims, 5 Drawing Figures

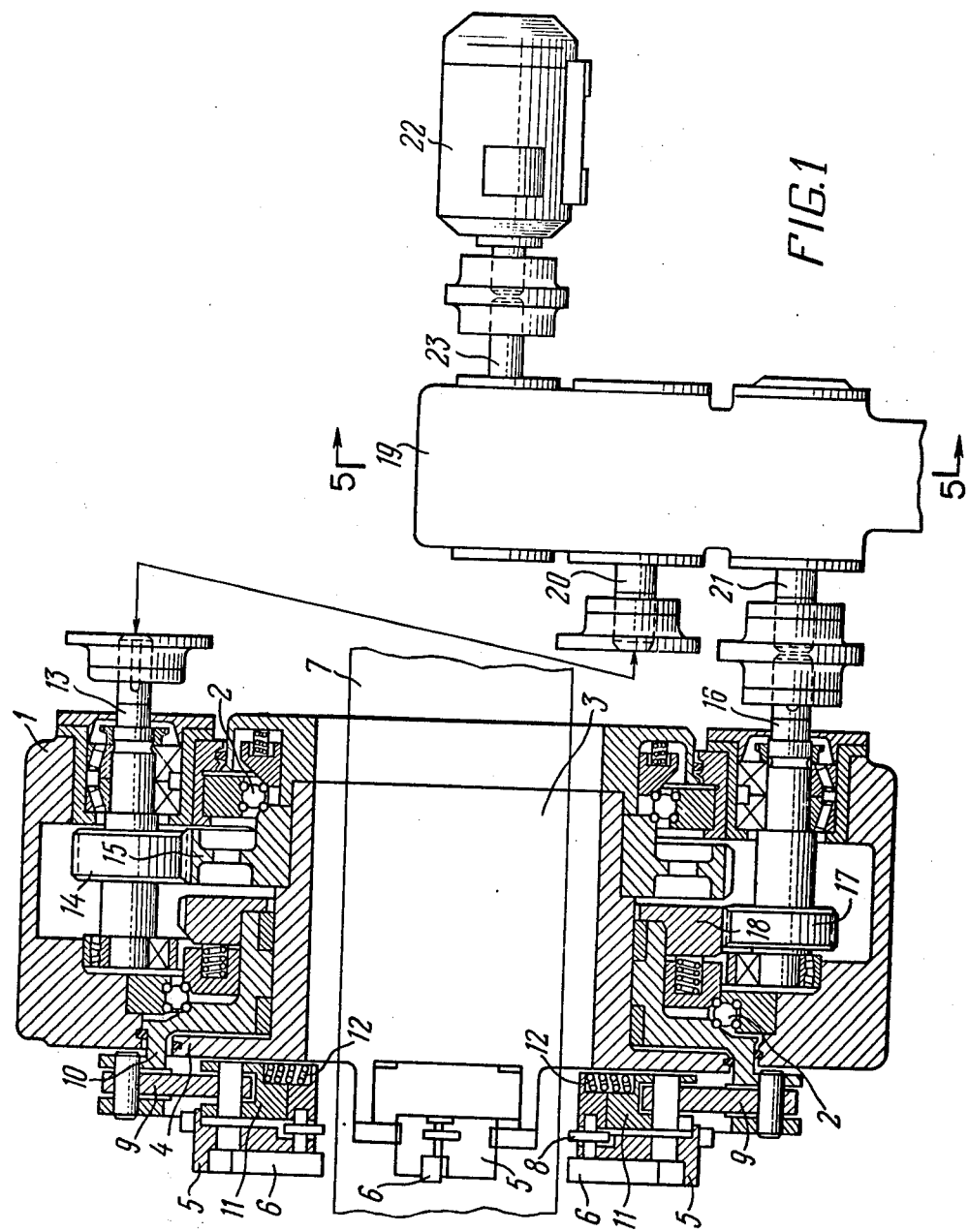

4,061,078

DEVICE FOR REMOVING EXTERNAL CIRCULAR FINS FROM PIPE JOINTS

FIELD OF THE INVENTION

The present invention relates to resistance butt welding of piping and particularly to devices for removal of external circular fins from the joints of the pipes welded together.

BACKGROUND

Known in the art is a device for removing external circular fins from the joints of the pipes being welded together, comprising a base, a hollow rotor with a faceplate running in the base bearings, carriages mounted on the rotor faceplate, a mechanism for effecting a radial traverse of the carriages, having a holder fitted on the rotor so as to rotate with respect thereto, and a drive for the rotor and for the carriage radial traversing mechanism.

A main disadvantage inherent in such devices for removing external circular fins resides in the incomplete removal of the fins whenever the pipe joints are found to have an oval shape, inasmuch as the cutting tools (cutters) are held in the carriages which describe strictly predetermined orbital paths around the pipes being welded and therefore are incapable of tracing the pipe surface, which in fact departs from a true circumference.

In the known device, the cutter is fed at a constant rate, therefore when removing an external circular fin having a cross-sectional shape approximating a triangular one, the cutting force applied and the power consumed are essentially variable values.

This results in overloading the drive when the tool is fed at high rates and, accordingly, in underloading the drive at lower feed rates of the cutter. To obviate said disadvantage said known devices provide for manual cutter feed control in the course of operation, which badly affects the productive efficiency of the device and deteriorates the quality of machining.

Moreover, the device incorporates two self-contained drives, viz., the rotor drive and the carriage radial traverse drive. Therefore, special mechanisms must be provided to bring the rotational speeds of both drives in synchronism. This adds to the bulkiness of the device and makes its construction and service costs still higher.

In addition, said mechanisms fail to provide aa programmed misalignment of the rotor and holder rotational speed to suit particular operating conditions. At best, they would be able to perform a preset program under given operating conditions; whenever the latter vary, the entire feed drive needs resetting.

SUMMARY OF THE INVENTION

It is therefore a primary and essential object of the present invention to provide such a device for removal of external circular fins from the joints of the pipes being welded together that has higher productive efficiency compared to the known devices of a similar type.

It is another object of the present invention to provide such a device for removal of external circular fins from pipe joints that have provision for uniform fin removal around the entire joint irrespective of whether the shape of the pipes being welded together are cylindrical or departs therefrom.

It is still another object of the present invention to provide such a device for removal of external circular fins from the joints of the pipes being welded together that is capable of removing fins formed in the course of welding, having any cross-sectional shape, the drive of the device being under constant load.

The above and other objects are satisfied by a device for removing external circular fins from pipe joints made by resistance butt welding, comprising a base; a hollow rotor with a faceplate, said rotor being mounted in the base; carriages mounted on the rotor faceplate; a mechanism for effecting a radial traverse of the carriages, said mechanism having a holder fitted on the rotor rotatably with respect thereto; and a drive for the rotor and for the carriage traversing mechanism, wherein according to the invention each of the carriages has its own roller adapted to trace over the surface of the pipes being treated, while the mechanism for the radial traverse of the carriages is composed of links with one of their ends articulated to the holder and with the other end articulated to slide blocks, each of which is housed in a bore in the respective carriage with the possibility of radial movement therein and is connected to a spring gauged for the cutting force, the other end of which spring thrusts against the bottom of the bore in the carriage, whereas the drive of the rotor and of the carriage traversing mechanism has two output shafts, of which one is kinematically associated with the rotor, and the other, with the holder, and is provided with a mechanism for program control of the difference between the rotational speeds of said shafts.

Due to the provision of a roller on each of the carriages, adapted to trace over the surface of the pipes under treatment, the proposed device is able to completely and uniformly remove external circular fins around the entire pipe joint irrespective of whether the shape of the pipes being welded together is a true cylinder or departs therefrom.

Furthermore, the proposed device enables speed synchronism of the rotor and of the carriage radial traversing mechanism to be obtained.

It is expedient for the mechanism for program control of the difference between the rotational speeds of the shafts kinematically associated with the rotor and holder, respectively, to be made as a differential drive interconnecting said shafts, the housing of said drive being essentially an internal-and-external rim gear loosely rotating around the shaft kinematically associated with the holder. The external rim gear of the differential drive housing is in mesh with the gear set on the shaft kinematically associated with the rotor, while the internal rim gear of said housing is in mesh, through planet pinions, with the differential drive sun gear on the shaft kinematically associated with the holder. The carrier of the planet pinions is constructed as a gear loosely running around the shaft kinematically associated with the holder, while the rim of the planet pinion carrier is in mesh with a rack engaged with the piston of a hydraulic cylinder which controls the traverse of the carriages.

BRIEF DESCRIPTION OF THE DRAWING

Hereafter the present invention will be described in a detailed description of an illustrative embodiment thereof with reference to the accompanying drawings wherein:

FIG. 1 is a longitudinal-section view of a device for removing external fins, according to the invention; .

DETAILED DESCRIPTION

Figure 3:
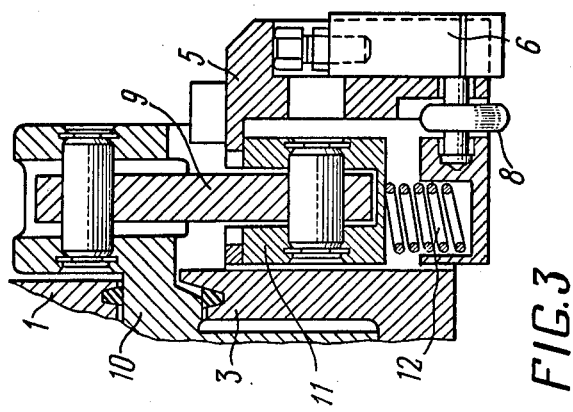
FIG. 3 is a sectional elevation view taken along line 3—3 in FIG. 2.
Figure 2:
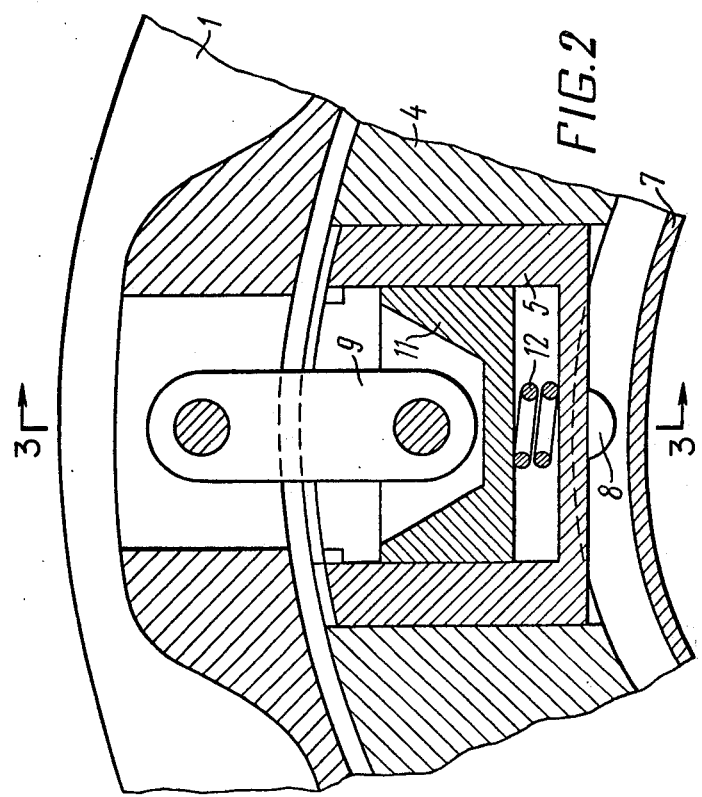
FIG. 2 is a view in section of a carriage, according to the invention.

The herein-proposed device for removing external circular fins from the joints of pipes made by a resistance butt welding comprises a base (FIGS. 1, 2) in the bearings 2 of which is mounted a rotor 3 with a faceplate 4. Carriages 5 (four in number as illustrated in FIG. 1) are mounted on the faceplate 4 and in recesses thereof. Each of the carriages carries cutting tools 6 therein. Additionally, each of the carriages 5 is provided with a roller 8 adapted to trace over the surface of a pipe 7 under treatment. A mechanism for radial traversing of the carriages 5 is composed of links 9 having one of their ends articulated to a holder 10 and the other ends connected to slide blocks 11. Each of the slide blocks 11 is accommodated in a bore in the corresponding carriage 5 with the possibility of radial movement therein. A spring 12 gauged for the cutting force is located between the bottom of the bore and the end of the slide block 11. The holder 10 is free to rotate around the rotor 3. The rotor 3 receives drive from a shaft 13 through matched gears 14 and 15, the latter being rigidly set on the rotor 3. The holder 10 obtains its drive from a shaft 16 through maatched gears 17 and 18, the latter being rigidly fitted on the holder 10. Drive 19 of the rotor 10 and of the traversing mechanism of the carriages 5 has two output shafts 20 and 21 interconnected with the respective shafts 13 and 16 through couplings. The drive 19 makes use of a single motor 22 (either electric or hydraulic) which is connected to a shaft 23 of the drive 19 through a coupling.

Figure 4:
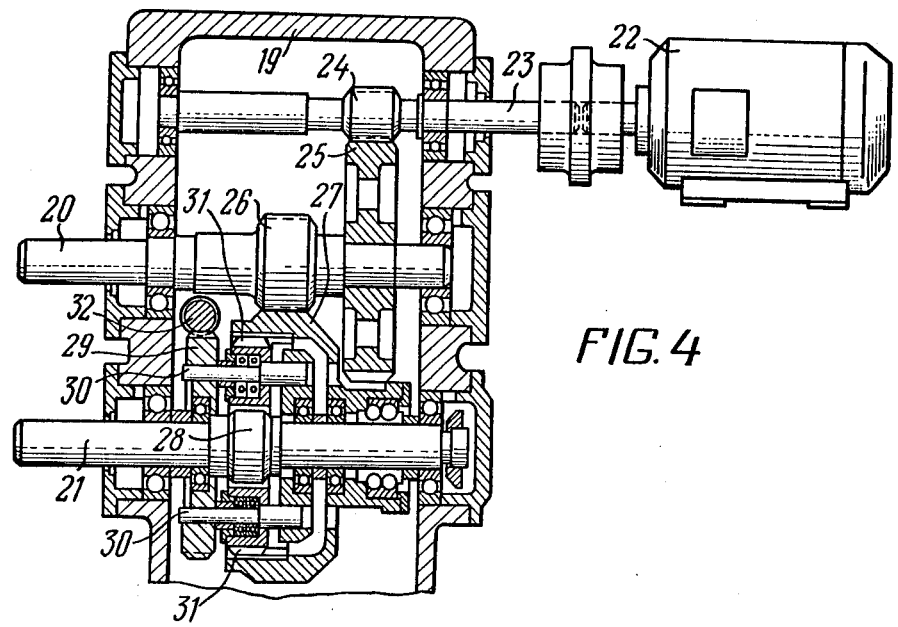
FIG. 4 is a longitudinal-section view of a drive for the rotor and for the mechanism of radial traverse of the carriages, according to the invention.
Figure 5:
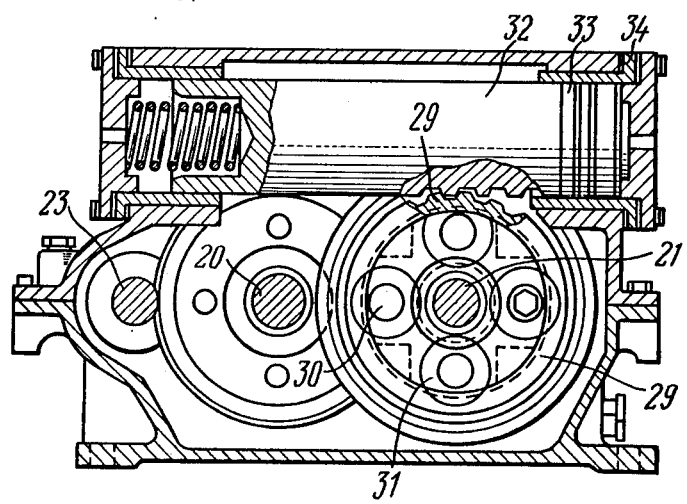
FIG. 5 is a sectional elevation view taken along line 5—5 in FIG. 1.

The drive 19 (FIGS. 4, 5) comprises a housing accommodating a gearing consisting of matched gears 24 and 25, the former being rigidly fitted on the shaft 23, while the latter is rigidly set on the shaft 20. A gear 26 is also rigidly set on the shaft 20, said gear being in mesh with the external rim gear of a differential drive housing 27. The latter is essentially an internal-and-external rim gear 27 loosely rotatable around the shaft 21 on which a gear 28 is rigidly set, being in fact the sun gear of the differential drive. A planet pinion carrier 29 (FIG. 5) of the differential drive is a gear loosely rotatable around the shaft 21. Planet pinions 31 are set on pins 30 of the carrier 29, said pinions being in mesh both with the internal rim gear of the housing 27 and with the gear 28. A gear rack 32 is mounted in the housing of the drive 19, capable of longitudinal motion, said rack meshing with the rim gear of the pinion carrier 29. The rack 32 is rigidly connected to a piston 33 of a hydraulic cylinder 34 which controls the traverse of the carriages 5.

With the device operating, the pipe joint is fed under the cutting tool 6. To keep the pipes against rotation a special arrangement is provided (not shown). Then the motor 222 is turned to impart rotation to the shaft 20 via the gears 24 and 25, from whence rotation is transmitted through the coupling to the shaft 13 and further, through the matched gears 14 and 15 to the rotor 3. Concurrently with the shaft 20, rotation is translated through the gear 26 to the differential drive housing 27.

With the pinion carrier 29 locked, rotation is transmitted through the planet pinions 31 meshed with the sun gear 28 and the housing 27 to the shaft 21. The gear ratio of the differential drive is so selected that with the pinion carrier 29 locked, the shaft 21 runs at a synchronous speed with the shaft 20. Rotation from the shaft 21 is transmitted through the coupling to the shaft 16 from whence rotation is imparted through the matched gears 17 and 18 to the holder 10. The gear ratio of the gears 17, 18 and of the gears 14, 15 is the same. Since the speed of the shafts 16 and 13 is the same with the pinion carrier 29 locked, the speed of the rotor 3 and the holder 10 is the same as well.

To impart feed motion to the cutting tools towards the pipe being machined, oil is force-fed into the cylinder 34 with the result that the piston 33 travels and urges the rack 32 to move and rotate the pinion carrier 29 around the shaft 21. Rotation of the pinion carrier 29 imparts extra speed to the gear 28, thus resulting in different speeds of the shafts 16 and 20. Thereby the holder 10 starts to advance relative to the rotor 3 through an angle relative to the holder. The result is that the links 9 move the slide blocks 11 which act through the springs 12 to move the carriages 5 with the tools 6 towards the center of the joint being treated. As oil is fed into the cylinder 34 the tools bite into the fin until the rollers 8 start riding over the pipe surface, thus tracing the latter. In the case of an elliptical pipe, the cutting force will increase when passing from the major semiaxis of the ellipse to the minor semiaxis thereof, to exceed the magnitude for which the spring 12 is gauged, with the result that the spring 12 will be compressed, thus raising the carriage 5 above the slide block 11 and, consequently, tracing the pipe surface. Upon cessation of the oil feed to the hydraulic cylinder 34, the feed motion of the tools 6 discontinues, too. Thus, by varying the oil flow rate one can control the tool feed rate. To return the tools 6 to the initial position, oil from the hydraulic cylinder 34 is discharged, and the piston 32 is returned into its initial position, thus rotating the carrier 29 of the planet pinions 31. Thereupon the motor 22 is turned off.

What is claimed is:

1. A device for removing external circular fins from pipe joints made by resistance butt welding, comprising: a base; a hollow rotor mounted in said base; a faceplate mounted on said rotor; carriages mounted on said faceplate, each of said carriages having a bore; a roller secured to each of said carriages and adapted to trace over the surface of the pipes under treatment; a holder fitted on said rotor rotatably therearound; springs gauged for the cutting force having one of their ends thrusting against the bottom of the bore in each said respective carriage; slide blocks, each housed in the bore of said respective carriage and adapted for radial movement and with one end interconnected with the other end of said spring; means for effecting radial traverse of said carriages including links having one of their ends articulated to said holder and the other of their ends articulated to said slide blocks; means for driving the rotor and the carriage radial traversing means including an output shaft of said driving means for driving the rotor and for actuating the carriage radial traversing means kinematically associated with said rotor; another output shaft of said driving means for driving the holder and for actuating the carriage radial traversing mechanism kinematically associated with said holder; said driving means further including means for control of the difference between the rotational speeds of said output shafts for driving the rotor and the carriage radial traversing means.

2. A device as claimed in claim 1, wherein the means for control of the difference between the rotational speeds of the shaft kinematically associated with the rotor and with the holder, respectively comprises a differential drive interconnecting said shafts including a housing having internal-and-external rim gears loosely rotatable around the shaft kinematically associated with the holder, the external rim gear of said housing being in mesh with a gear set on the shaft kinematically associated with the rotor, while the internal rim gear thereof meshes, through planet pinions, with a sun gear of said differential drive set on the shaft kinematically associated with the holder, a pinion carrier essentially comprising a gear loosely rotatable around the shaft kinematically associated with the holder, and a rim gear on said pinion carrier is in mesh with a rack interconnected with the piston of a hydraulic cylinder which controls the traverse of the carriages.

* * * * *